US008370569B2

(12) United States Patent
Jibbe et al.

(10) Patent No.: US 8,370,569 B2
(45) Date of Patent: Feb. 5, 2013

(54) METHOD FOR REMOTE DATA BACK UP WITH DE-DUPLICATION AND RECOVERY FROM CLUSTERED SECONDARY STORAGE ARRAYS

(75) Inventors: Mahmoud Jibbe, Wichita, KS (US); Selvaraj Rasappan, Tamil Nadu (IN); Senthil Kannan, Pondicherry (IN); Satish Subramanian, Tamil Nadu (IN)

(73) Assignee: Netapp, Inc., Sunnyvale, CA (US)

( * ) Notice: Subject to any disclaimer, the term of this patent is extended or adjusted under 35 U.S.C. 154(b) by 550 days.

(21) Appl. No.: 12/211,838

(22) Filed: Sep. 17, 2008

(65) Prior Publication Data

US 2010/0070704 A1 Mar. 18, 2010

(51) Int. Cl.
*G06F 12/00* (2006.01)

(52) U.S. Cl. . 711/114; 711/161; 711/170; 711/E12.001; 711/E12.003

(58) Field of Classification Search .................. 711/114, 711/161, 170, E12.001, E12.002, E12.003
See application file for complete search history.

(56) References Cited

U.S. PATENT DOCUMENTS

| 6,173,377 | B1 * | 1/2001 | Yanai et al. | 711/162 |
|---|---|---|---|---|
| 6,549,921 | B1 * | 4/2003 | Ofek | 714/13 |
| 6,654,752 | B2 * | 11/2003 | Ofek | 1/1 |
| 6,745,283 | B1 * | 6/2004 | Dang | 711/113 |
| 7,039,657 | B1 * | 5/2006 | Bish et al. | 1/1 |
| 7,383,407 | B1 * | 6/2008 | Kiselev | 711/162 |
| 7,672,981 | B1 * | 3/2010 | Faibish et al. | 707/999.204 |
| 2003/0069889 | A1 * | 4/2003 | Ofek | 707/100 |
| 2007/0030641 | A1 * | 2/2007 | Hall et al. | 361/685 |
| 2008/0201527 | A1 * | 8/2008 | Suzuki et al. | 711/114 |

* cited by examiner

*Primary Examiner* — Mardochee Chery
(74) *Attorney, Agent, or Firm* — Haynes and Boone, LLP

(57) ABSTRACT

A method, system, and apparatus a method for remote data back up with de-duplication and recovery from clustered secondary storage arrays are disclosed. In one embodiment, a method includes writing a set of data of a primary storage module (e.g., may be coupled to the secondary storage cluster with a fiber channel network) to a secondary storage module of a secondary storage cluster, writing an other set of data of the primary storage module to an other secondary storage module coupled to the secondary storage module, writing the set of data from the secondary storage module to the other secondary storage module of the secondary storage cluster (e.g., the other secondary storage module may contain both the set of data and the other set of data), and writing the other set of data from the other secondary storage module to the secondary storage module.

20 Claims, 4 Drawing Sheets

METHOD FOR REMOTE DATA BACK UP WITH DE-DUPLICATION AND RECOVERY FROM CLUSTERED SECONDARY STORAGE ARRAYS

FIELD OF TECHNOLOGY

This disclosure relates generally to an enterprise method, a technical field of software and/or hardware technology and, in one example embodiment, to a method for remote data back up with de-duplication and recovery from clustered secondary storage arrays.

BACKGROUND

An enterprise may store a set of data in a primary storage array (e.g., a redundant array of independent disks (RAID) system, etc.). The primary storage array may be comprised of a number of storage volumes. The primary storage array may be damaged and/or destroyed by a catastrophic event (e.g., a natural disaster, a system failure, etc.). In order to ensure continuity of access to the set of data, the enterprise may store a copy of the set of data in a secondary storage cluster (e.g., not directly accessible by an enterprise computer). The secondary storage cluster may be located in a geographical separate location than the primary storage array. The secondary storage cluster may be comprised of a certain number of secondary storage arrays (e.g., a certain number of other RAID systems associated with the primary storage array).

A process of synchronizing the set of data in the primary storage with the copy of the set of data in the secondary storage array may be implemented. A certain amount of processing power may be used in order for the primary storage array to write the set of data to the secondary storage cluster. Consequently, constantly using the primary storage array to replicate all changes in the set of data in the primary storage array to the copy of the set of data in each secondary storage array may degrade the performance of the primary storage array.

Additionally, a particular secondary storage array may only contain a copy of the portion of the set of data and/or not the complete copy of the set of data. Thus, the copy of the particular portion of the set of data may be lost if the particular secondary volume is damaged and/or destroyed.

SUMMARY

A method, system, and apparatus for remote data back up with de-duplication and recovery from clustered secondary storage arrays are disclosed. In one aspect, a method includes writing a set of data of a primary storage module (e.g., may be coupled to the secondary storage cluster with a fibre channel network) to a secondary storage module of a secondary storage cluster, writing an other set of data of the primary storage module to an other secondary storage module coupled to the secondary storage module, writing the set of data from the secondary storage module to the other secondary storage module of the secondary storage cluster (e.g., the other secondary storage module may contain both the set of data and the other set of data), and writing the other set of data from the other secondary storage module to the secondary storage module (e.g., secondary storage module may contain both the set of data and the other set of data).

The method may include using a de-duplication algorithm to write a change to the set of data of the primary storage module to the secondary storage module. The method may use the de-duplication algorithm to write an other change to the other set of data of the primary storage module to the other secondary storage module. The method may write the change to the set of data from the secondary storage module to the other secondary storage module (e.g., the other secondary storage module may contain both the change to the set of data and the other change to the other set of data). The method may include writing the other change to the other set of data from the other secondary storage module to the secondary storage module (e.g., the secondary storage module may contain both the change to the set of data and the other change to the other set of data). The primary storage module may include a redundant array of independent disks (RAID).

The method may also include algorithmically determining an alternative primary storage module the secondary storage module and/or the other secondary storage module according to a specified metric (e.g. geographical proximity to lost primary storage site, speed of data transfer between various secondary storage sites, safety of relative storage sites, bandwidth, speed with full state of primary replicated in a respective secondary etc.). The method may include transforming an alternative primary storage into an other primary storage module that may perform a same set of functions as the primary storage module if the primary storage is unable to function at a specified threshold of operation.

In another aspect, the system includes a primary storage module to store a set of data and write a copy of the set of data to a plurality of secondary storage modules, a plurality of secondary storage modules to store a copy of the set of data, and a secondary storage module of the plurality of secondary storage modules to store a particular portion of the copy of the set of data and to write the particular portion of the copy of the set of data to a plurality of other secondary storage modules of the plurality of secondary storage modules.

The system may include a de-duplication module of the secondary storage module to eliminate a redundant data that may be found in both the set of data stored in the primary storage module and the copy of the set of data stored in the secondary storage module. The system may also include a primary control module of the primary storage module to continuously write any change to the copy of the set of data to the secondary storage modules.

The system may also include a secondary control module of the secondary storage module to write the particular portion of the copy of the set of data to the other secondary storage modules of the secondary storage modules. The secondary control module may continuously write any change to the particular portion of the copy of the set of data to the other secondary storage modules of the secondary storage modules. A fibre channel network may couple the primary storage module with the secondary storage modules. The primary storage module may include a redundant array of independent disks (RAID). The secondary storage module may comprise an other RAID.

The secondary storage modules may be located in a geographical separate location. The copy of the set of data may be divided into the secondary storage modules (e.g., each secondary storage module of the secondary storage modules may contain the particular portion of the copy of the set of data). The system may also include control modules (e.g., may be coupled with each secondary storage module) to write a portion of the copy of the set of data stored by a particular secondary storage module to each of the other storage modules of the secondary storage modules (e.g., each secondary storage module may contain the copy of the set of data).

The secondary storage module may use a fibre channel network to write the particular portion of the copy of the set of data to the other secondary storage module of the secondary storage modules. The secondary storage module may write the particular portion of the copy of the set of data to the other secondary storage module through an interconnection particular to the secondary storage module and/or the other secondary storage module. The system may include a dedicated port to couple the secondary storage module and/or the other secondary storage module for the writing of data between the secondary storage module and the other secondary storage module. The secondary storage module may initiate writing the particular portion of the copy of the set of data when the primary storage module may write the copy of the set of data to the secondary storage modules.

A specified secondary storage module may become a next primary storage module if the primary storage module ceases to function at a threshold level. The next primary storage module may perform the same set of operations as the primary storage module performed before ceasing to function at the threshold level. A specified small computer system interface (SCSI) command from the primary storage module may write the copy of the set of data that may initiate the secondary storage module to asynchronously write the particular portion of the copy to the set of data to the secondary storage modules. The next available secondary storage module may be determined based on a set of criteria that may include a geographical proximity to the primary storage module, accessibility by a main computer and/or a speed of operation.

In yet another aspect, a method includes associating a primary storage module with a cluster of secondary storage modules, copying a data of a storage volume of the primary storage module to a secondary storage module of the cluster of secondary storage modules, and configuring the secondary storage module to asynchronously copy a copy of the data to all other storage modules of the cluster of secondary storage modules.

The method may include copying a data from an other storage volumes of the primary storage module to the other storage modules of the cluster of secondary storage modules (e.g., a particular data of a particular storage volume of the primary storage module may be stored in a particular other secondary storage module). The method may also include configuring each particular other secondary storage module to asynchronously copy each particular data to all other storage modules of the cluster of secondary storage module (e.g., each secondary storage module of the cluster of secondary storage modules may contain a copy of data).

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system, and apparatus to are disclosed. Although the present embodiments have been described with reference to specific example embodiments, it will be evident that various modifications and changes may be made to these embodiments without departing from the broader spirit and scope of the various embodiments.

Figure 1:
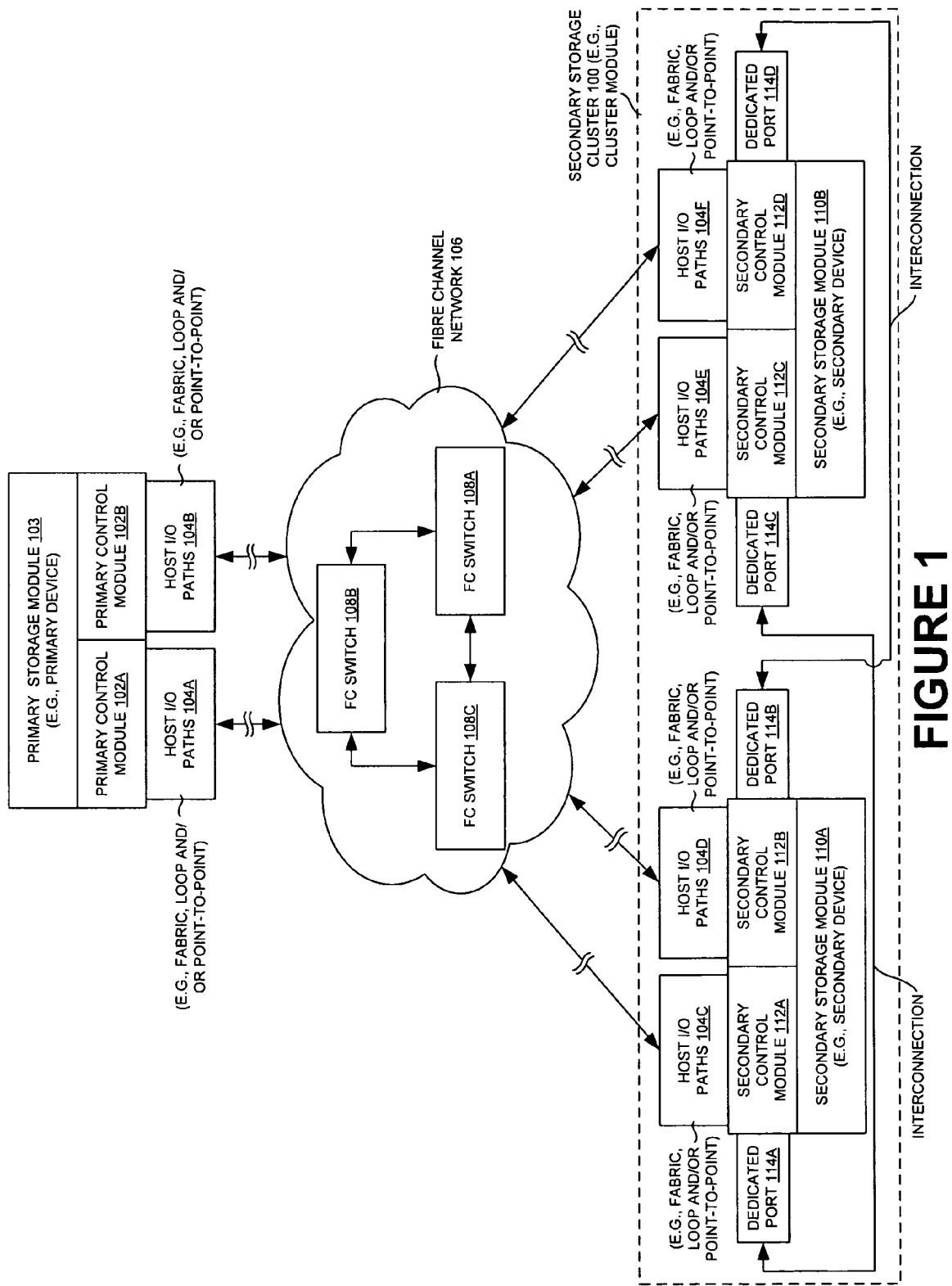
FIG. 1 is a system view illustrating the synchronization of data in primary storage module with a copy of set of data in secondary storage module, according to one embodiment.

In one embodiment, a method includes writing a set of data of a primary storage module (e.g., the primary storage module 103 of FIG. 1 (e.g., may be coupled to the secondary storage cluster with a fibre channel network)) to a secondary storage module (e.g., the secondary storage module 110A-B of FIG. 1) of a secondary storage cluster (e.g., the secondary storage cluster 100 of FIG. 1), writing an other set of data of the primary storage module 103 to an other secondary storage module coupled to the secondary storage module 110A-B, writing the set of data from the secondary storage module 110A-B to the other secondary storage module of the secondary storage cluster 100 (e.g., the other secondary storage module may contain both the set of data and the other set of data), and writing the other set of data from the other secondary storage module to the secondary storage module 110A-B (e.g., secondary storage module may contain both the set of data and the other set of data).

In another embodiment, the system includes a primary storage module (e.g., the primary storage module 103 of FIG. 1) to store a set of data and write a copy of the set of data to secondary storage modules 110A-B, secondary storage modules 110A-B to store a copy of the set of data, and a secondary storage module 110A-B of the secondary storage modules 110A-B to store a particular portion of the copy of the set of data and to write the particular portion of the copy of the set of data to other secondary storage modules of the secondary storage modules 110A-B.

In yet another embodiment, a method includes associating a primary storage module (e.g., the primary storage module of FIG. 1) with a cluster of secondary storage modules 110A-B, copying a data of a storage volume of the primary storage module 103 to a secondary storage module 110A-B of the cluster of secondary storage modules 110A-B, and configuring the secondary storage module 110A-B to asynchronously copy a copy of the data to all other storage modules of the cluster of secondary storage modules 110A-B.

FIG. 1 is a system view illustrating the synchronization of data in primary storage module with a copy of set of data in secondary storage module, according to one embodiment. Particularly, FIG. 1 illustrates a secondary storage cluster 100, a primary control module 102A-B, a primary storage module 103, a host I/O paths (e.g., fabric, loop and/or point to point) 104A-F, a fibre channel network 106, a FC switch 108A-C, a secondary storage module 110A-B, a secondary control module 112A-D, and a dedicated port 114A-D, according to one embodiment.

The secondary storage cluster 100 (e.g., may be located in a geographical separate location than the primary storage array) may be comprised of a certain number of secondary storage arrays (e.g. a certain number of other RAID systems associated with the primary storage array) to store (e.g., backup) the data that may be present in the primary storage to prevent data blackout during the failure of primary storage module 103. The primary control module 102A-B of the primary storage module 103 may continuously write any change to the copy of the set of data to the secondary storage modules 110A-B in the secondary storage cluster 100 from the storage device (e.g., the primary storage module 103, the secondary storage cluster 100, etc.).

The primary storage module 103 may be the storage area in the data processing unit (e.g., may be in the redundant array inexpensive disk) in which the data may be stored for quick access of data (e.g., server, data center, etc.). The host I/O paths (e.g., fabric, loop and/or point to point) 104A-F may be the server that may know about the logical disk and also may be transparent to any changes to the meta-data (e.g., primary storage module 103). The fibre channel network 106 may be a network that may use the optical fibre (e.g., passive, synchronous, etc) to write the particular portion of the copy of the set of data (e.g., may be from the primary storage module 103) to the other secondary storage module of the of secondary storage cluster 100. The FC switch 108A-C, may be a network switch (e.g., may be compatible with the fibre channel (FC) protocol) which may allow communication (e.g., many to many, point to point, etc.) between various storage devices (e.g., between the primary storage module 103 and the secondary storage module 110A-B) and may implement zoning (e.g., a mechanism that may disable unwanted traffic between certain fabric nodes).

The secondary storage module 110A-B may be the storage device (e.g., that may differ from the primary storage) that may not be directly accessible by the data processing unit (e.g., may use the input/output channel to access the secondary storage) and may not lose data when the device is powered down (e.g., non-volatile). The secondary control module 112A-D may continuously write any change to the particular portion of the copy of the set of data to the other secondary storage modules of secondary storage cluster 100. The dedicated port 114A-D may be a port that may be used to couple the secondary storage modules 110A-B for the writing of data between the secondary storage module and the other secondary storage module.

In example embodiment, the secondary storage cluster 100 may include the secondary storage module 110A-B. The secondary storage module 110A-B may include the secondary control module 112A-D. The dedicated port 114A-D may couple the secondary storage modules 110A-B. The primary storage module 103 may include the primary control module 102A-B. The host I/O path (e.g., fabric, loop, and/or point to point) 104A-F may couple the primary storage module 103 and the secondary storage module 110A-B with the fibre channel network 106. The fibre channel network 106 may include the FC switch 108A-C. The secondary storage module 110A-B may communicate with each other.

In one embodiment, the set of data of a primary storage module (e.g., the primary storage module 103 of FIG. 1) may be written (e.g., using the primary control module 102A-B of FIG. 1) to a secondary storage module (e.g., the secondary storage module 110A-B) of a secondary storage cluster (e.g., the secondary storage cluster 100 of FIG. 1). Another set of data of the primary storage module 103 may be written (e.g., using the primary control module 102A-B of FIG. 1) to an other secondary storage module coupled to the secondary storage module. The set of data from the secondary storage module 110A-B may be written (e.g., using the secondary control module 112A-D of FIG. 1) to the other secondary storage module of the secondary storage cluster 100 (e.g., such that the other secondary storage module may contain both the set of data and the other set of data).

The other set of data may be written (e.g., using the secondary control module 112A-D of FIG. 1) from the other secondary storage module to the secondary storage module 110A-B (e.g., the secondary storage module 110A-B may contain both the set of data and the other set of data). The primary storage module 103 may be coupled (e.g., may use the fibre channel network 106 of FIG. 1) to the secondary storage cluster 100 with a fibre channel network 106. The primary storage module 103 may include of a redundant array of independent disks (RAID). An alternative primary storage module, the secondary storage module 110A-B and the other secondary storage module may be algorithmically determined (e.g., using the secondary control module 112A-D of FIG. 1) according to a specified metric.

An alternative primary storage may be transformed (e.g., using the primary control module 102A-B of FIG. 1) into an other primary storage module that may perform a same set of functions as the primary storage module 103 if the primary storage may be unable to function at a specified threshold of operation. The primary storage module 103 may be associated (e.g., using the fibre channel network 106 of FIG. 1) with a cluster of secondary storage modules. The data of a storage volume of the primary storage module 103 may be copied (e.g., using the primary control module 102A-B of FIG. 1) to a secondary storage module 110A-B of the cluster of secondary storage modules. The secondary storage module 110A-B may be configured (e.g., using the secondary control module 112A-D of FIG. 1) to asynchronously copy a copy of the data to all other storage modules of the cluster of secondary storage modules.

The data from a other storage volumes of the primary storage module 103 may be copied (e.g., using the primary control module 102A-B of FIG. 1) to the other storage modules of the cluster of secondary storage modules such that a particular data of a particular storage volume of the primary storage module 103 may be stored in a particular other secondary storage module. The secondary storage module 110A-B may be configured (e.g., using the secondary control module 112A-D of FIG. 1) to asynchronously copy each particular data to all other storage modules of the cluster of secondary storage modules 110A-B such that each secondary storage module of the cluster of secondary storage modules contains a copy of data.

The primary control module 102A-B of the primary storage module 103 may continuously write any change to the copy of the set of data to the secondary storage modules. A secondary control module (e.g., the secondary control module 112A-B of FIG. 1) of the secondary storage module 110A-B to write the particular portion of the copy of the set of data to the other secondary storage modules. The secondary control module 112A-D may continuously write any change to the particular portion of the copy of the set of data to the other secondary storage modules. The fibre channel network (e.g., the fibre channel network 106 of FIG. 1) may couple the primary storage module 103 (e.g., may be a redundant array of independent disks (RAID)) with the secondary storage modules (e.g., the other RAID). The primary storage module 103 of FIG. 1 may store a set of data and write a copy of the set of data to the secondary storage modules 110A-B (e.g., may be used to store a copy of the set of data)

The control modules (e.g., coupled with each secondary storage module) may write a portion of the copy of the set of data stored by a particular secondary storage module 110A-B to each of the other storage modules such that each secondary storage module may contain the copy of the set of data.

The secondary storage module 110A-B may write the particular portion of the copy of the set of data to the other secondary storage module through an interconnection particular to the secondary storage module 110A-B and the other secondary storage module. The dedicated port 114A-D may be used to couple the secondary storage module 110A-B and the other secondary storage module for the writing of data between the secondary storage module 110A-B and the other secondary storage module. The secondary storage module 110A-B may initiate writing the particular portion of the copy of the set of data when the primary storage module 103 writes the copy of the set of data to the secondary storage modules 110A-B.

The specified secondary storage module may become a next primary storage module if the primary storage module 103 ceases to function at a threshold level. The next primary storage module may perform the same set of operations as the primary storage module 103 performed before ceasing to function at the threshold level. A specified small computer system interface (SCSI) command from the primary storage module 103 may write the copy of the set of data initiates to the secondary storage module 110A-B that may asynchronously write the particular portion of the copy of the set of data to the secondary storage modules 110A-B. The next available secondary storage module 110A-B may be determined based on a set of criteria comprising a geographical proximity to the primary storage module 103, accessibility by a main computer and a speed of operation.

Figure 2:
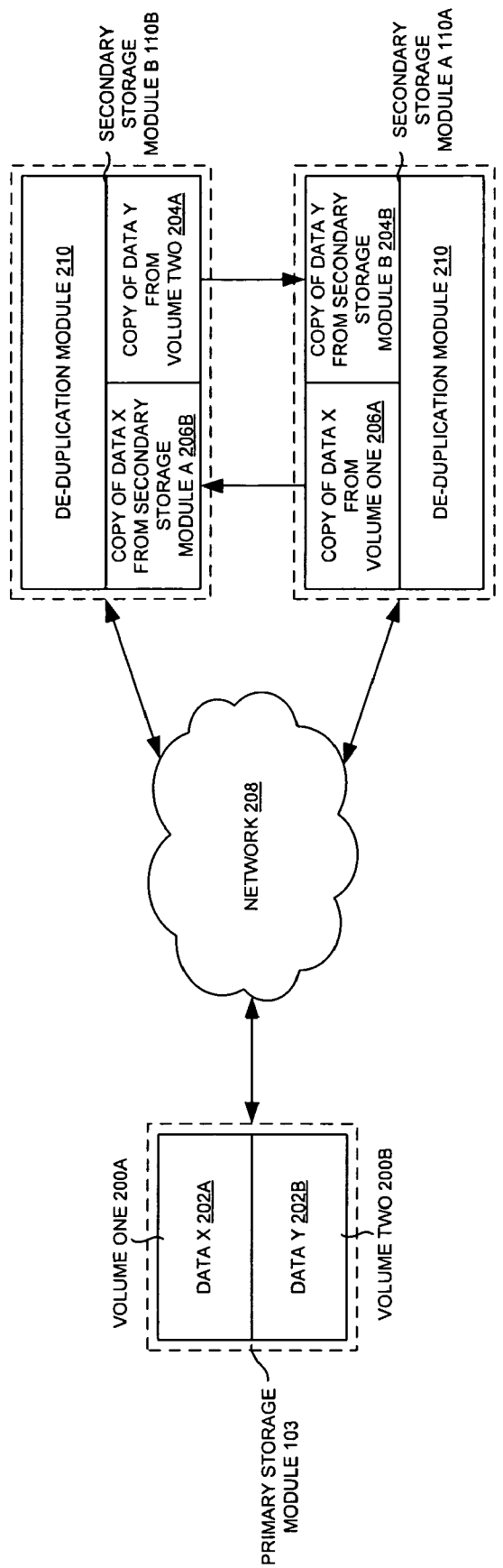
FIG. 2 is an exploded view illustrating storage modules, de-duplication module and fibre network, according to one embodiment.

FIG. 2 is an exploded view illustrating storage modules, de-duplication module and fibre network, according to one embodiment. Particularly, FIG. 2 illustrates the primary storage module 103, the secondary storage module 110A-B, a volume one 200A, a volume two 200B, a data X 202 A, a data Y 202B, a copy of data Y from volume two 204A, a copy of data Y from secondary storage module B 204B, a copy of data X from volume one 206A, a copy of data X from secondary storage module A 206B, a network 208, a de-duplication module 210, according to one embodiment.

The volume one 200A may be the portion of the data (e.g., may be data X 202A) stored in the redundant array inexpensive disk (e.g., the primary storage module 103). The volume two 200B may be another portion of data (e.g., may be data Y 202B) stored in the redundant array inexpensive disk (e.g., the primary storage module 103). The data X 202 A may be the portion of data (e.g., the volume one 200A) that may be stored in the redundant array inexpensive disk (e.g., the primary storage module 103). The data Y 202B may be the portion of data (e.g., the volume two 200B) that may be stored in the redundant array inexpensive disk (e.g., the primary storage module 103).

The copy of data Y from volume two 204A may be the data (e.g., may be the data from the volume 2 of the primary storage module 103) of the redundant array of inexpensive drive in the secondary storage module B 110B. The copy of data Y from secondary storage module B 204B may the data (e.g., backup data, mirror data, etc.) which may be transferred from the secondary storage module B 100B. The copy of data X from volume one 206A may be the data (e.g., may be the data from the volume one of the primary storage module 103) of the redundant array of inexpensive drive in the secondary the storage module A 110A.

The copy of data X from secondary storage module A 206B may be the data (e.g., backup data, mirror data, etc.) which may be transferred from the secondary storage module A 100A. The network 208 may be the fibre channel network 106 that may use the optical fibre (e.g., passive, synchronous, etc) to write the particular portion of the copy of the set of data (e.g., may be from the primary storage module 103) to the other secondary storage module of the secondary storage cluster 100. The de-duplication module 210 (e.g., may get activated for the secondary storage modules 110A-B) may be residing in the secondary storage cluster 100 that may prevent the unwanted mirroring of all the data and may copy only the change made to the data (e.g., may be in the primary storage module 103) by an efficient de-duplication algorithm.

In example embodiment, the primary storage module 103 may include the volume one 200A and volume two 200B. The volume one 200A may include the data X 202A. The volume two 200B may include the data Y 202B. The secondary storage module B 110B may include the copy of data Y from volume two 204A and the copy of data X from the secondary storage module A 206B. The secondary storage module A 110A may include the copy of data from the secondary storage module B 204B and the copy of data X from volume one 206A. The secondary storage module A 110A and secondary storage module B 110B may include the de-duplication module 210. The primary storage module 103 may enable the secondary storage module A 110A and the secondary storage module B 110B through the network 208.

In one embodiment, the de-duplication algorithm may be used to write (e.g., using the de-duplication module 210 of FIG. 2) a change to the set of data of the primary storage module 103 to the secondary storage module 110A-B. The de-duplication algorithm may be used to write (e.g., using the de-duplication module 210 of FIG. 2) an other change to the other set of data of the primary storage module 103 to the other secondary storage module. The change to the set of data may be written from the secondary storage module 110A-B to the other secondary storage module (e.g., the other secondary storage module may contain both the change to the set of data and the other change to the other set of data). The other change may be written (e.g., using the secondary control module 112A-D of FIG. 1) to the other set of data from the other secondary storage module to the secondary storage module 110A-B (e.g., may contain both the change to the set of data and the other change to the other set of data). The secondary storage module 110A-B may store a particular portion of the copy of the set of data and to write the particular portion of the copy of the set of data to other secondary storage modules. The de-duplication module 210 of the secondary storage module 110A-B may eliminate a redundant data that may be found in both the set of data stored in the primary storage module 103 and the copy of the set of data stored in the secondary storage module. The copy of the set of data may be divided into secondary storage modules (e.g., may be located in a geographical separate location) such that each secondary storage module contains the particular portion of the copy of the set of data. The secondary storage module 110A-B may use a fibre channel network (e.g., the network 208 of FIG. 2) that may write the particular portion of the copy of the set of data to the other secondary storage module.

FIG. 3 is a process flow for writing a set of data from a primary storage module to a secondary storage module and the other secondary storage module, according to one embodiment.

In operation 302, a set of data of a primary storage module (e.g., the primary storage module 103 of FIG. 1) may be written (e.g., using the primary control module 102A-B of FIG. 1) to a secondary storage module (e.g., the secondary storage module 110A-B) of a secondary storage cluster (e.g., the secondary storage cluster 100 of FIG. 1). In operation 304, another set of data of the primary storage module 103 may be written (e.g., using the primary control module 102A-B of FIG. 1) to an other secondary storage module coupled to the secondary storage module. In operation 306, the set of data from the secondary storage module 110A-B may be written (e.g., using the secondary control module 112A-D of FIG. 1) to the other secondary storage module of the secondary storage cluster 100 (e.g., such that the other secondary storage module may contain both the set of data and the other set of data). In operation 308, the other set of data may be written (e.g., using the secondary control module 112A-D of FIG. 1) from the other secondary storage module to the secondary storage module 110A-B (e.g., the secondary storage module 110A-B may contain both the set of data and the other set of data).

In operation 310, a de-duplication algorithm may be used to write (e.g., using the de-duplication module 210 of FIG. 2) a change to the set of data of the primary storage module 103 to the secondary storage module 110A-B. In operation 312, the de-duplication algorithm may be used to write (e.g., using the de-duplication module 210 of FIG. 2) an other change to the other set of data of the primary storage module 103 to the other secondary storage module.

Figure 3A:
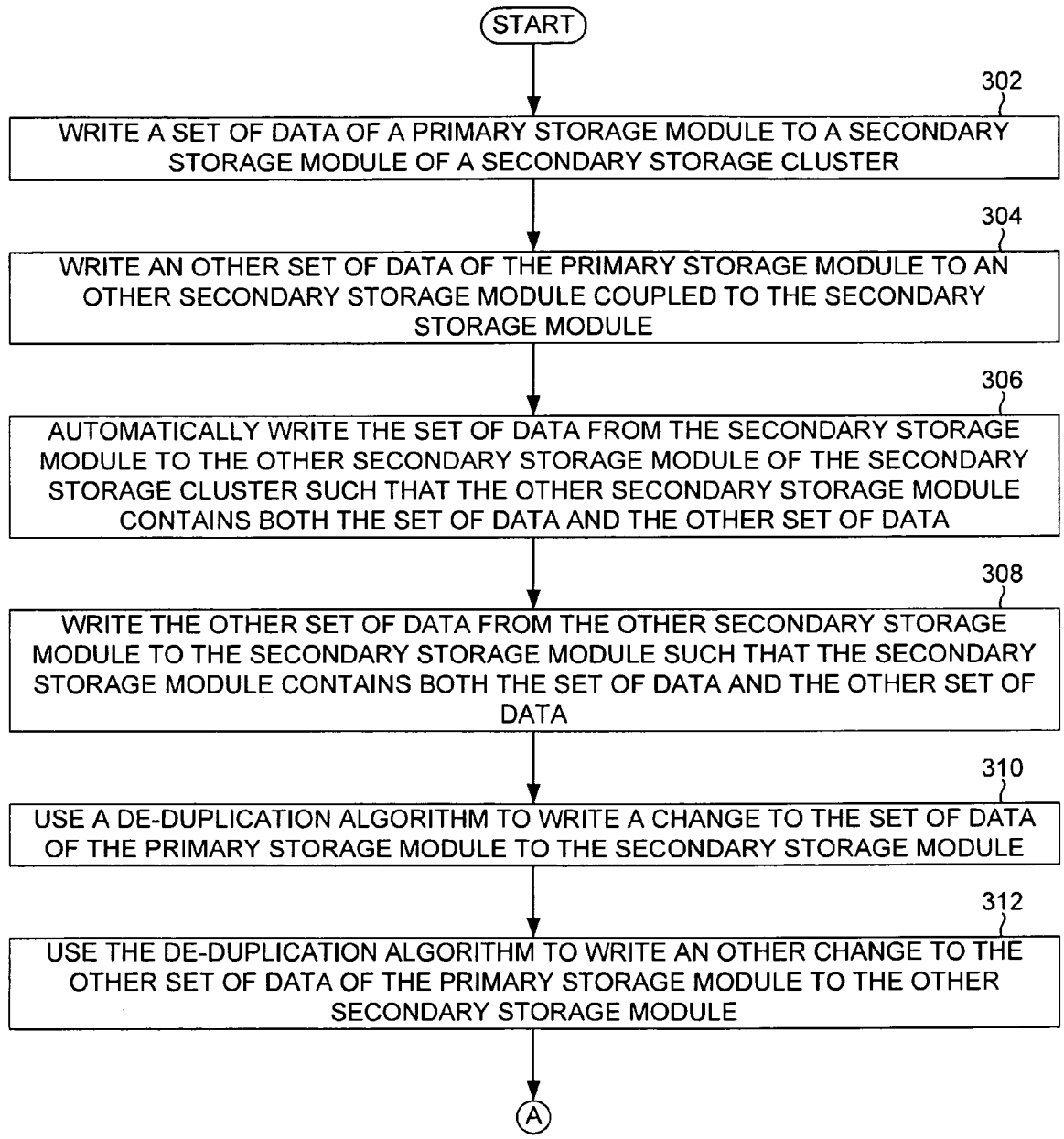
FIG. 3A is a process flow for writing a set of data from a primary storage module to a secondary storage module and the other secondary storage module, according to one embodiment.
Figure 3B:
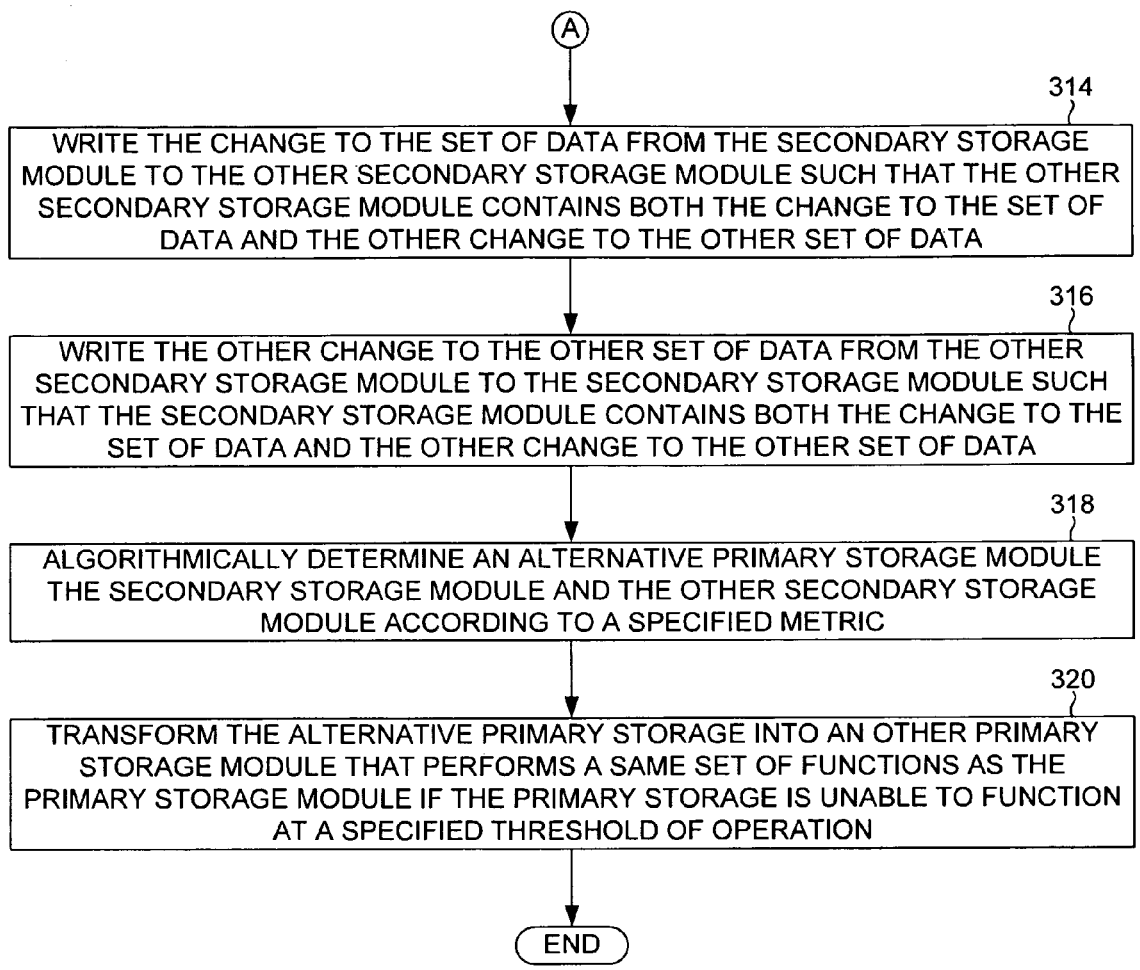
FIG. 3B is a continuation of process flow of FIG. 3A illustrating additional operation, according to one embodiment.

FIG. 3B is a continuation of process flow of FIG. 3A illustrating additional operation, according to one embodiment. In operation 314, the change to the set of data may be written from the secondary storage module 110A-B to the other secondary storage module (e.g., the other secondary storage module may contain both the change to the set of data and the other change to the other set of data). In operation 316, the other change may be written (e.g., using the secondary control module 112A-D of FIG. 1) to the other set of data from the other secondary storage module to the secondary storage module 110A-B (e.g., may contain both the change to the set of data and the other change to the other set of data).

The primary storage module 103 may be coupled (e.g., may use the fibre channel network 106 of FIG. 1) to the secondary storage cluster 100 with a fibre channel network 106. The primary storage module 103 may include of a redundant array of independent disks (RAID). In operation 318, an alternative primary storage module, the secondary storage module 110A-B and the other secondary storage module may be algorithmically determined (e.g., using the secondary control module 112A-D of FIG. 1) according to a specified metric. In operation 320, an alternative primary storage may be transformed (e.g., using the primary control module 102A-B of FIG. 1) into an other primary storage module that may perform a same set of functions as the primary storage module 103 if the primary storage may be unable to function at a specified threshold of operation.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the primary control module 102A-B, the primary storage module 103, the secondary storage module 110A-B, the secondary control module 112A-D of FIG. 1, may be enabled using a primary control module 102A-B, a primary storage module 103, a secondary storage module 110A-B, a secondary control module 112A-D and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   a. writing a set of data by a primary storage module to a secondary storage module of a secondary storage cluster;
   b. writing an other set of data by the primary storage module to an other secondary storage module coupled to the secondary storage module;
   c. writing the set of data from the secondary storage module to the other secondary storage module of the secondary storage cluster such that the other secondary storage module contains both the set of data and the other set of data; and
   d. writing the other set of data from the other secondary storage module to the secondary storage module such that the secondary storage module contains both the set of data and the other set of data, the set of data and the other set of data constituting data associated with the primary storage module,
   wherein upon the completion of a., b., c. and d., the set of data and the other set of data are contemporaneously stored in the primary storage module, the secondary storage module and the other secondary storage module.

2. The method of claim 1, further comprising:
   using a de-duplication algorithm to write a change to the set of data of the primary storage module to the secondary storage module;
   using the de-duplication algorithm to write an other change to the other set of data of the primary storage module to the other secondary storage module;
   writing the change to the set of data from the secondary storage module to the other secondary storage module such that the other secondary storage module contains both the change to the set of data and the other change to the other set of data; and
   writing the other change to the other set of data from the other secondary storage module to the secondary storage module such that the secondary storage module contains both the change to the set of data and the other change to the other set of data.

3. The method of claim 2, wherein the primary storage module is coupled to the secondary storage cluster through a fibre channel network.

4. The method of claim 3, wherein the primary storage module comprises of a redundant array of independent disks (RAID).

5. The method of claim 4, further comprising;
   algorithmically determining an alternative primary storage module and at least one of the secondary storage module and the other secondary storage module according to a specified metric; and
   transforming the alternative primary storage module into an other primary storage module that performs a same set of functions as the primary storage module if the primary storage is unable to function at a specified threshold of operation.

6. A system comprising:
a primary storage module to store a set of data;
a plurality of secondary storage modules to have a copy of the set of data written thereto through the primary storage module and to store a copy of the set of data, a secondary storage module of the plurality of secondary storage modules being configured to store a particular portion of the copy of the set of data and to write the particular portion of the copy of the set of data to at least one other secondary storage module of the plurality of secondary storage modules such that the set of data from the primary storage module is mirrored across the plurality of secondary storage modules wherein upon the completion of the mirroring, the set of data is contemporaneously stored in the primary storage module, the secondary storage module and the other secondary storage module.

7. The system of claim 6, further comprising a de-duplication module of the secondary storage module to eliminate a redundant data that is found in both the set of data stored in the primary storage module and the copy of the set of data stored in the plurality of secondary storage modules.

8. The system of claim 7, further comprising a primary control module of the primary storage module to continuously write any change to the copy of the set of data to the plurality of secondary storage modules.

9. The system of claim 7, further comprising a secondary control module of the secondary storage module to write the particular portion of the copy of the set of data to the at least one other secondary storage module of the plurality of secondary storage modules.

10. The system of claim 9, wherein the secondary control module continuously writes any change to the particular portion of the copy of the set of data to the at least one other secondary storage module of the plurality of secondary storage modules.

11. The system of claim 6, further comprising:
a fibre channel network to couple the primary storage module to the plurality of secondary storage modules,
wherein the primary storage module comprises a redundant array of independent disks (RAID), and
wherein the secondary storage module comprises an other RAID.

12. The system of claim 11,
wherein at least one of the plurality of secondary storage modules is located in a geographical separate location,
wherein the copy of the set of data is divided into the plurality of secondary storage modules such that each secondary storage module of the plurality of secondary storage modules includes the particular portion of the copy of the set of data, and
wherein the system further comprises a plurality of control modules to write a portion of the copy of the set of data stored by a particular secondary storage module to each of the other storage modules of the plurality of secondary storage modules such that each secondary storage module contains the copy of the set of data, and
wherein at least one control module is coupled with each secondary storage module.

13. The system of claim 11, wherein the secondary storage module uses a fibre channel network to write the particular portion of the copy of the set of data to the at least one other secondary storage module of the plurality of secondary storage modules.

14. The system of claim 11, wherein the secondary storage module writes the particular portion of the copy of the set of data to the at least one other secondary storage module through an interconnection particular to the secondary storage module and the at least one other secondary storage module.

15. The system of claim 14, further comprising a dedicated port to couple the secondary storage module and the at least one other secondary storage module for the writing of data therebetween.

16. The system of claim 15, wherein the secondary storage module initiates writing the particular portion of the copy of the set of data when the primary storage module writes the copy of the set of data to the plurality of secondary storage modules.

17. The system of claim 15,
wherein a specified secondary storage module becomes a next primary storage module if the primary storage module ceases to function at a threshold level,
wherein the next primary storage module performs the same set of operations as the primary storage module performed before ceasing to function at the threshold level, and
wherein a specified small computer system interface (SCSI) command from the primary storage module to write the copy of the set of data initiates the secondary storage module to asynchronously write the particular portion of the copy of the set of data to the plurality of secondary storage modules.

18. The system of claim 17, wherein the next available secondary storage module is determined based on at least one of a set of criteria comprising a geographical proximity to the primary storage module, accessibility by a main computer and a speed of operation.

19. A method comprising:
associating a primary storage module with a cluster of secondary storage modules;
copying a data of a storage volume of the primary storage module to a secondary storage module of the cluster of secondary storage modules; and
configuring the secondary storage module to asynchronously copy a copy of the data to all other storage modules of the cluster of secondary storage modules, wherein upon the completion of the asynchronous copying, the set of data is contemporaneously stored in the primary storage module, the secondary storage module and the all other storage modules of the cluster of secondary storage modules.

20. The method of claim 19, further comprising:
copying data from a plurality of other storage volumes of the primary storage module to the other storage modules of the cluster of secondary storage modules such that a particular data of a particular storage volume of the primary storage module is stored in a particular other secondary storage module; and
configuring each particular other secondary storage module to asynchronously copy each particular data to all other storage modules of the cluster of secondary storage modules such that each secondary storage module of the cluster of secondary storage modules contains a copy of the data.

* * * * *